(12) United States Patent
Sharma et al.

(10) Patent No.: US 10,824,543 B2
(45) Date of Patent: Nov. 3, 2020

(54) SYSTEM AND METHOD FOR AUTOMATED SOFTWARE TEST CASE DESIGNING BASED ON MACHINE LEARNING (ML)

(71) Applicants: Mayank Mohan Sharma, Dublin, CA (US); Sudhanshu Gaur, Mountain House, CA (US); Sohel Dadia, San Francisco, CA (US)

(72) Inventors: Mayank Mohan Sharma, Dublin, CA (US); Sudhanshu Gaur, Mountain House, CA (US); Sohel Dadia, San Francisco, CA (US)

(73) Assignees: Mayank Mohan Sharma, Dublin, CA (US); Sudhanshu Gaur, Mountain House, CA (US)

( * ) Notice: Subject to any disclaimer, the term of this patent is extended or adjusted under 35 U.S.C. 154(b) by 301 days.

(21) Appl. No.: 15/916,262

(22) Filed: Mar. 8, 2018

(65) Prior Publication Data

US 2019/0278699 A1 Sep. 12, 2019

(51) Int. Cl.
*G06F 11/36* (2006.01)
*G06F 9/451* (2018.01)
*G06N 20/00* (2019.01)

(52) U.S. Cl.
CPC .......... *G06F 11/3684* (2013.01); *G06F 9/451* (2018.02); *G06N 20/00* (2019.01)

(58) Field of Classification Search
CPC ....................................................... G06F 11/36

USPC ......................................................... 714/38.1
See application file for complete search history.

(56) References Cited

U.S. PATENT DOCUMENTS

| | | | | |
|---|---|---|---|---|
| 9,032,373 | B1* | 5/2015 | Gupta | G06F 11/3688 717/127 |
| 2007/0240154 | A1* | 10/2007 | Gerzymisch | G06F 8/61 717/174 |
| 2008/0082968 | A1* | 4/2008 | Chang | G06F 11/3688 717/128 |
| 2010/0180260 | A1* | 7/2010 | Chikkadevaiah | G06F 11/3664 717/125 |
| 2014/0033175 | A1* | 1/2014 | Lee | G06F 11/3684 717/124 |
| 2019/0073293 | A1* | 3/2019 | Sharma | G06F 11/3672 |
| 2019/0171553 | A1* | 6/2019 | Chauhan | G06F 11/3684 |

* cited by examiner

*Primary Examiner* — Kamini B Patel

(57) ABSTRACT

The invention relates to a system and method for automated software testing based on ML. The system comprises a software design module 101 which is configured to provide at least one of business requirement, flow document etc. The requirement parser 102 extracts the actionable items from output of the software design module 101. A ML engine 103 uses supervised ML algorithm to map actionable items with the historic test suites. The test suites and test cases are stored in a NoSQL database. Further, a test design module 104 is configured to create automatic test case design based on ML and assign priorities to the test cases using the parser. A human feedback 105 to the system helps to make the system learns or adjusts the decision making to be more precise.

19 Claims, 2 Drawing Sheets

SYSTEM AND METHOD FOR AUTOMATED SOFTWARE TEST CASE DESIGNING BASED ON MACHINE LEARNING (ML)

DESCRIPTION OF THE INVENTION

Technical Field of the Invention

The present invention relates to an automated software test case designing. More particularly, the invention relates to automated test case designing based on Machine Learning.

Background of the Invention

Machine Learning (ML) is a field of computer, which explores the study, and construction of algorithms that make predictions on data—such algorithms making data-driven predictions or decisions, through building a model from sample inputs. ML algorithms are a collection of programs mainly based on solving classification problem, applying logistic regression, and used to derive error/cost optimization model.

Software testing is a process by which it is validated and verified that the software works as expected based on the provided or required specifications. Software test automation is the process by which the need to repeatedly manually test certain functionalities of software is eliminated by deploying or using programs and script to do the same.

Software test case designing is a process by which the software is tested based on certain preconditions. A required setup is necessary for the software to function. Once the preconditions and the setup are defined, the software is tested by following defined steps to provide with the results. These actual results of the tests are then compared with expected results, which provide the evaluation of the tested software's quality.

Currently, the test case designing is a manual process. It takes significant amount of man hours to first go through all of the business requirements for which the software is being built. These requirements also specify how the software will function and what is expected. All these requirements are first used to create test scenarios and then further these test scenarios are broken down into multiple test cases. This test case designing process is very costly and also not very efficient.

There is no test automation technique currently present that could be widely used to solve this problem. Performance, efficiency and productivity of the test engineers are severely affected due to this manual task, which is rather important but is often redundant and not interesting. Time spent in test case designing could be spent on testing which could prove to be a more beneficial scenario for all the stakeholders.

Scaling of present day test case design process requires more man hours contributed by test engineers. There are no effective tools or methods available currently by which we can automate this process so everything is largely done manually.

Time taken to read a single business requirement, understand it, think of all the test scenarios & test cases and write them manually takes at least 20-30 minutes. Currently there is no system available to quickly update obsolete test cases. Creation of dashboard from the current test case design process is difficult, as not all the test management tools provide this ability based on covered business requirements.

The U.S. patent application Ser. No. 15/234,603 (referred herein as '603) titled "Test case generation" discloses methods, computer program products, and systems for generating comprehensive test cases covering new events. The invention can be used to receive a request to generate a test case. The request comprises a coverage schema associated with a first set of events to be covered in the generated test case. The invention updates the coverage schema, which comprises adding a second set of events to be covered in the generated test case and generating constraints used to satisfy requirements for meeting the first set of events and the second set of events in the updated coverage schema. Further, the invention generates a test case using the generated constraints and the updated coverage schema.

The U.S. patent application Ser. No. 14/573,441 (referred herein as '441) titled "Techniques for automatically generating test cases" discloses a technique for generating test cases includes receiving a new product specification for an application. A noun-verb pairing is performed on the new product specification. An attempt is made to locate a similar noun-verb pairing in a previous product specification for the application that corresponds to the new noun-verb pairing. In response to locating the similar noun-verb pairing in the previous product specification, a new test case is generated by modifying an existing test case that is associated with the similar noun-verb pairing in the previous product specification. In response to not locating the similar noun-verb pairing in the previous product specification, the fact that the new test case was not generated is indicated. However, the system does not disclose the manual feedback mechanism.

Hence, there exists a need for a system which automates the software test case designing based on ML in an efficient manner.

SUMMARY OF THE INVENTION

The present invention overcomes the drawback in the prior art and provides an automated software test case design based on Machine Learning (ML) in an efficient and precise manner.

The system comprises a software design module which is configured to provide at least one of business requirement, flow document, web/mobile/desktop User Interface (UI) pages or docs for Application Programming Interface (APIs). Further, a requirement parser extracts the actionable items from at least one of business requirement, flow document, web/mobile/desktop UI pages, docs for APIs which are received from the software design module. The actionable items are data sources which provide results.

In an embodiment of the invention, a ML engine uses a supervised ML algorithm to map actionable items with the historic test suites. A NoSQL database is configured to hold UI element and the test cases. Further, a test design module is configured to create automatic test case based on ML and assign priorities to the test cases using the parser. The test cases created based on relational mapping between UI elements/actionable items with the test suites. Further, parser parses for keywords to assign priorities in the generated test cases.

In a preferred embodiment, a manual feedback mechanism is provided for adjusting the machine learning algorithm to fine tune the mapping. A dashboard facilitates the representation of the facts and figures obtained from various computational resources.

Thus, the invention provides an autonomous learning, prediction and decision making by providing an automated ML based system which tracks, learns and implements test case writing for respective business requirements. Test Engineers can easily modify the machine learning model based on special cases. The system also has the inbuilt feature to provide notifications to all stakeholders.

Further, the advantage of the present system is that it is highly scalable since the integration is easy. The centralized ML engine need not to be changed for any test automation framework or testing type i.e. mobile apps, application programming interface, front end systems etc.

Further, the feedback mechanism is provided in the system to fine tune the quality. Since all the processes are automated, it saves time of the concerned persons. Quality is controlled by algorithms and programs.

Furthermore, the system provides dashboards based deep insights that make it easy to glance through the quality of the automated test cases via dashboards. Creation of dashboards is easy, as the whole process is automated end to end.

BRIEF DESCRIPTION OF DRAWINGS

The foregoing and other features of embodiments will become more apparent from the following detailed description of embodiments when read in conjunction with the accompanying drawings. In the drawings, like reference numerals refer to like elements.

DETAILED DESCRIPTION OF THE INVENTION

Reference will now be made in detail to the description of the present subject matter, one or more examples of which are shown in figures. Each example is provided to explain the subject matter and not a limitation. Various changes and modifications obvious to one skilled in the art to which the invention pertains are deemed to be within the spirit, scope and contemplation of the invention.

The system comprises a software design module which is configured to provide at least one of business requirement, flow document, web/mobile/desktop User Interface (UI) pages, docs for Application Programming Interface (APIs). The requirement parser extracts the actionable items from output of the software design module. A ML engine uses supervised ML algorithm to map actionable items with the historic test suites. The test suites and test cases are stored in a NoSQL database. Further, a test design module is configured to create automatic test case design based on ML and assign priorities to the test cases using the parser. The automated test cases are created based on relational mapping between UI elements and the test suites. The parser parses for keywords to assign priorities to the generated test cases.

Figure 1:
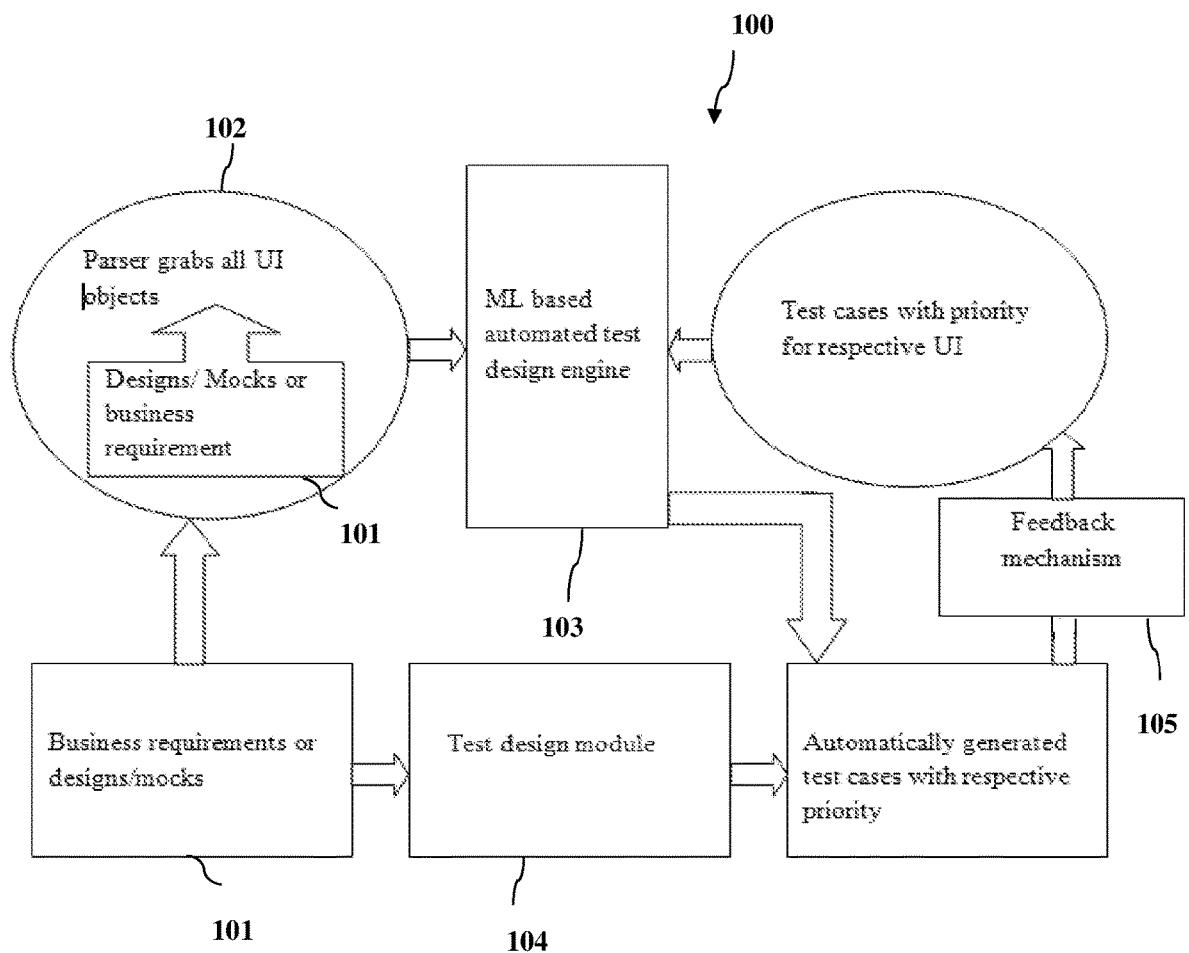
FIG. 1 illustrates a system for automated software test case designing based on ML.

FIG. 1 illustrates a system for automated software test case designing based on ML. In a preferred embodiment of the invention, a software design module 101 provides business requirement/flow document or web/mobile/desktop User Interface (UI) pages or docs for Application Programming Interface (APIs). Generally, the business requirement/flow documents may or may not be in parser friendly format to extract actionable items. The web/mobile/desktop pages are used to get all the UI elements which are present in these respective page types. Also, for APIs the api docs are used to get actionable items.

Preferably, all documents are stored at a central location in cloud based storage repositories for easy access. These documents are named with specific standard format to identify them easily. The standard format for naming can be decided by the organization or stakeholders.

In a preferred embodiment of the invention, the files or pages or documents which are received from the software design module 101 is used by the requirement parser 102 to extract the UI elements. Generally, the test cases are based on UI elements. Further, the endpoints and payload is extracted from APIs to form test cases.

In a preferred embodiment of the invention, the requirement parser 102 is configured to parse the documents with different types of files and formats. The requirement parser 102 extracts the actionable items or UI elements from the multiple files.

In an embodiment of the invention, the requirement parser 102 transfers the information to a ML based test design engine 103 which uses supervised ML algorithm to map parsed UI elements/actionable items with the historic test suites.

In a preferred embodiment of the invention, the parsed UI elements or actionable items are identified based on keywords. ML based test design engine 103 maps the parsed UI elements with the test cases which are obtained from previously designed test suites. Generally, a test suite is a collection of test cases. For example Button (UI element) is mapped to "Tap or click on the Button" (which is historic test case). The mapping is done by the supervised ML algorithm which establishes the relation and creates a model for future test case generation. ML engine utilizes keyword from the UI element or actionable item to map with the test cases which also has the same keyword.

In an embodiment of the invention, a NoSQL database is configured to store the elements and the test cases. The ML algorithm analyses and creates a model such that certain UI element is mapped with the certain test cases using the data that is present in the database tables. The mapped results are also stored in the NoSQL database.

In a preferred embodiment of the invention, a test design module 104 uses the relational mapping created by supervised ML model for future automatic test case design. Further, the test design module 104 assign priorities to the test cases using a parser. The parser parses for certain keywords and then passes the keywords to supervised ML model that maps priorities to each generated test case. The test cases are prioritized based on the keywords they have in it.

Generally, the parser assigns the priority to any user action keywords. The parser marks the test cases with different priority. Generally, for example the priority 1 is assigned for tap, click, fill, submit, press etc. Further, a test case with keyword of "color" is of low priority so it is given as priority 3. A test case with keyword "size" of a button has low priority i.e. priority 3. But test case with keyword "text" or "value" or "label" is of medium priority so it is marked as priority 2. Further, the test cases with words like "Location" or "Dimension" or "Top Right Corner" etc. were marked a priority 2.

In a preferred embodiment of the invention, priority 1 or high priority test cases are named as sanity test cases which need to run every time there is a new version or build of software available to test. Sanity test checks whether the software is able to perform its basic functionality as expected or not.

In a preferred embodiment of the invention, the combination of priority 1 and priority 2 test cases are named as regression test cases which include both high and medium priority test cases which need to be tested on new software.

Regression tests ensure that the software performs as expected after it is changed/modified or enhanced in the current latest build.

In a preferred embodiment of the invention, combination of priority 1, priority 2 and the priority 3 test cases are named as functional test suite which is used to comprehensively test the software by the test engineers.

Preferably, a test design module 104 provides the table with test cases. ML algorithm creates a model of mapping priorities based on keywords. This helps to get another model that adds priority to the test cases. Thus, complete test cases design with priority mappings are generated.

In a preferred embodiment of the invention, if a human test engineer thinks that the test cases which are mapped don't completely cover the test scenario, then he/she can fine tune or add/delete a test case mapping. A feedback mechanism 105 is provided to strengthen and make the machine learning model more precise. All these mappings and generated models are present in the NoSQL database. The feedback mechanism 105 is provided in the system to fine tune the quality. Since all the processes are automated, it saves time of the concerned persons.

In a preferred embodiment of the invention, dashboard is configurable to graphical user tools/programs/interfaces by which one can easily access the results, logs, test cases, key performance indicators etc.

Figure 2:
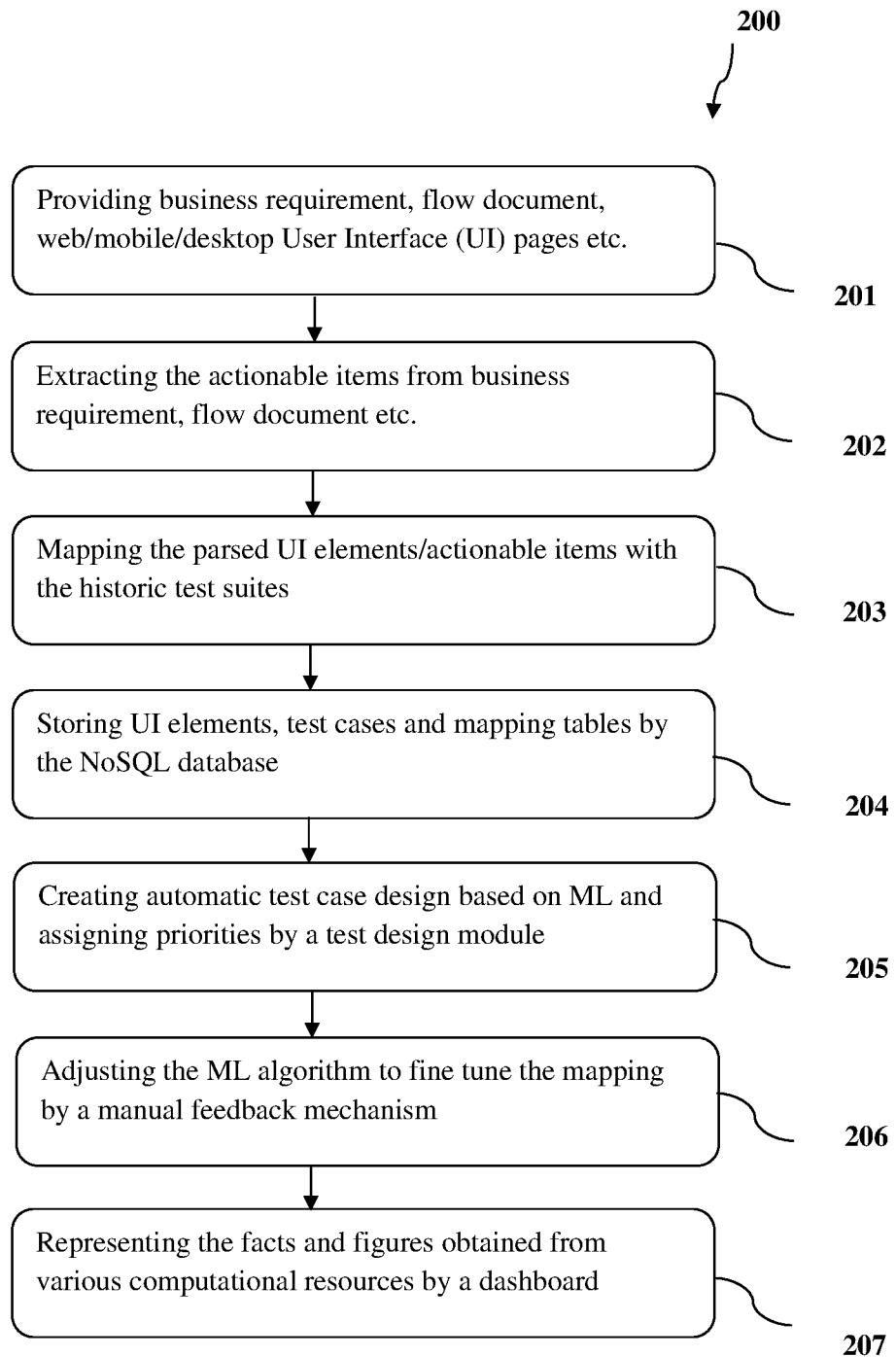
FIG. 2 illustrates a method for automated software test case designing based on ML.

FIG. 2 illustrates a method for automated software test case designing based on ML, in accordance to one or more embodiment of the present invention. The method for automated software test case design based on ML comprises the steps of providing the least one of business requirement, flow document, web/mobile/desktop User Interface (UI) pages, docs for Application Programming Interface (APIs) by a software design module at step 201. At step 202, a requirement parser extracts actionable items from at least one of business requirement, flow document, web/mobile/desktop UI pages, docs for APIs to generate the test cases. At step 203, a ML engine maps the parsed UI elements/actionable items with the historic test suites based on supervised ML algorithm. At step 204, the NoSQL database stores the UI elements, test cases and mapping tables in a cloud based storage. Further, the test case designs are created based on ML by a test design module. Furthermore, the test design module assigns priorities to the test cases using the parser. The creation of automated test cases is based on relational mapping between actionable items and the test suites at step 205. A manual feedback mechanism adjusts the ML algorithm to fine tune the mapping at step 206. Furthermore, a dashboard represents the facts and figures obtained from various computational resources at step 207.

Preferably, the feedback mechanism 105 is provided in the system to fine tune the quality. Since all the processes are automated, it saves time of the concerned persons. Quality is controlled by algorithms and programs. Further, the system provides dashboards based deep insights that make it easy to glance through the quality of the automated test cases via dashboards. Creation of dashboards is easy, as the whole process is automated end to end.

Compared to the current state-of-the-art software test case designing methods, the present invention offers faster operation and higher quality results due to a more focused analysis, ML algorithm and feedback mechanism. In comparison to static software analysis tools, the present invention offers a way to scale the analysis to find deep and intricate potentially multi-threaded software bugs. Furthermore, by using ML to learn program behavior, the present approach provides heuristics to automatically mine for hypothetical program-dependent properties. The present principles, related to computer software development and test case design, in particular, for improved software testing based on ML, incorporate a requirement parser, NoSQL database, feedback mechanism and a dashboard. It would be easy to glance through the quality of the automated test cases via dashboard. Hence, the overall quality can be checked and immediate action can be taken based on the observation.

Further, the techniques described in the various embodiments discussed above result in efficient, robust, and cost-effective management and testing of software production incidents subsequent to the release of a software product. The techniques described in the embodiments discussed above provide an automated process of test case designing thereby ensuring a consistent and predictive delivery of software product quality. ML and feedback mechanism of the process ensure that the process keeps improving its efficiency after putting to use. The feedback mechanism further receives feedback from users/engineer for continuous improvement of the process. Additionally, the techniques described in the embodiments discussed above analyze and learn from the pattern, correlate the keywords with the existing test cases, and ensure a smooth build, run, and reinstallation into production. Further, the techniques described in the embodiments discussed above are easy to build and use and can be integrated with any system.

The description of the present system has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A system (100) for automated software test case designing based on Machine Learning (ML), the system comprises:
   a) a memory to store instructions contained in a software design module (101), a requirement parser (102), a ML based test design engine (103), a test design module (104), a manual feedback mechanism (105) and a dashboard to automatically generate test cases based on machine learning;
   b) a processor operatively coupled to the memory, wherein the processor is configured to execute instructions stored in the software design module (101), a requirement parser (102), a ML based test design engine (103), a test design module (104), a manual feedback mechanism (105) and a dashboard to automatically generate test cases based on machine learning;
      a software design module (101) configured to provide at least one of business requirement, flow document, web/mobile/desktop User Interface (UI) pages and docs for Application Programming Interface (APIs);
      a requirement parser (102) configured to extract the UI elements/actionable items from at least one of business requirement, flow document, web/mobile/desktop UI pages and docs for APIs which are received from the software design module (101) to generate test cases, wherein the UI elements/actionable items are data sources which provide results;

a ML based test design engine (103) that uses supervised ML algorithm to map UI elements/actionable items with the historic test suites;

a NoSQL database configured to store UI element and the test cases;

a test design module (104) configured to create automatic test case design based on ML and assign priorities to the test cases using the parser, wherein the automated test cases created based on relational mapping between UI elements/actionable items and the historic test suites, wherein the parser parses for keywords to assign priorities to the generated test cases;

a manual feedback mechanism (105) for adjusting the machine learning algorithm to fine tune the mapping; and a dashboard configured to represent the facts and figures obtained from various computational resources.

2. The system (100) as claimed in claim 1, wherein at least one of business requirement, flow document, web/mobile/desktop User Interface (UI) pages, docs for Application Programming Interface (APIs) are stored in central location of the cloud based storage.

3. The system (100) as claimed in claim 1, wherein the UI elements are extracted from UI pages.

4. The system (100) as claimed in claim 1, wherein the endpoints, payload, headers, body, parameters are extracted from APIs.

5. The system (100) as claimed in claim 1, wherein the ML engine (103) maps the test cases with actionable items based on parsed keywords.

6. The system (100) as claimed in claim 1, wherein the manual feedback mechanism (105) is done by adding, deleting, modifying any data table/data.

7. The system (100) as claimed in claim 1, wherein the ML engine (103) prioritize the test cases as priority 1 test case, priority 2 test case and priority 3 test case.

8. The system (100) as claimed in claim 7, wherein the priority 1 test cases are named as sanity test cases which runs when new version of software is available to test.

9. The system (100) as claimed in claim 7, wherein the combination of priority 1 and priority 2 test cases are named as regression test cases which include both high and medium priority test cases that ensure the expected performance of the software after modification.

10. The system (100) as claimed in claim 7, wherein the combination of priority 1, priority 2 and the priority 3 test cases are named as functional test suite which is used to comprehensively test the software by the test engineers.

11. The system (100) as claimed in claim 1, wherein the computational resource includes test cases count for different test suites like sanity, regression and functional test suites respectively.

12. A method (200) for automated software test case designing based on Machine Learning (ML), the method comprising the steps of:

a. providing at least one of business requirement, flow document, web/mobile/desktop User Interface (UI) pages or docs for Application Programming Interface (APIs) by a software design module (101);

b. extracting the actionable items from at least one of business requirement, flow document, web/mobile/desktop UI pages, docs for APIs to generate the test cases, wherein the actionable items are data sources which can be acted upon to provide results;

c. mapping the parsed UI elements/actionable items with the historic test suites by a ML engine (103) based on supervised ML algorithm wherein the test suite comprises collection of test cases;

d. storing UI elements, test cases and mapping tables by a NoSQL database;

e. creating automatic test case design based on ML and assigning priorities to the test cases by a test design module (104) using the parser, wherein creating automated test cases based on relational mapping between actionable items and the test suites, wherein the parser parses for keywords to assign priorities to the generated test cases;

f. adjusting the ML algorithm to fine tune the mapping by a manual feedback mechanism (105); and g. representing the facts and figures obtained from various computational resources by a dashboard.

13. The method (200) as claimed in claim 12, wherein the business requirement, flow document, web/mobile/desktop User Interface (UI) pages, docs for Application Programming Interface (APIs) are stored in central location of the cloud based storage.

14. The method (200) as claimed in claim 12, wherein the UI elements are extracted from UI pages.

15. The method (200) as claimed in claim 12, wherein the endpoints, payload, headers, body, parameters are extracted from the APIs.

16. The method (200) as claimed in claim 12, wherein the ML engine maps the test cases with actionable items based on parsed keywords.

17. The method (200) as claimed in claim 12, wherein the manual feedback mechanism 105 is done by adding, deleting, modifying any data table/data.

18. The method (200) as claimed in claim 12, wherein the ML engine (103) prioritize the test cases as priority 1 test case, priority 2 test case and priority 3 test case.

19. The method (200) as claimed in claim 12, wherein the computational resource includes test cases count for different test suites like sanity, regression and functional test suites respectively.

* * * * *